United States Patent
Jang et al.

(10) Patent No.: US 7,953,304 B2
(45) Date of Patent: May 31, 2011

(54) SUPERCONDUCTING POWER CABLE CAPABLE OF QUENCH DETECTION AND QUENCH DETECTION SYSTEM USING THE SAME

(75) Inventors: Hyun-Man Jang, Gyeonggi-do (KR); Do-Woon Kim, Gyeonggi-do (KR); Ji-Hwan Kim, Gyeonggi-do (KR)

(73) Assignee: LS Cable Ltd., Anyang, Gyeonggi-do (KR)

( * ) Notice: Subject to any disclaimer, the term of this patent is extended or adjusted under 35 U.S.C. 154(b) by 75 days.

(21) Appl. No.: 12/500,417

(22) Filed: Jul. 9, 2009

(65) Prior Publication Data

US 2010/0099572 A1    Apr. 22, 2010

Related U.S. Application Data

(63) Continuation of application No. 11/596,637, filed as application No. PCT/KR2005/002085 on Jun. 30, 2005.

(30) Foreign Application Priority Data

Jan. 13, 2005  (KR) .................. 10-2005-0003423

(51) Int. Cl.
*G02B 6/00*    (2006.01)
*G02B 6/26*    (2006.01)

(52) U.S. Cl. ............................................ 385/12; 385/27

(58) Field of Classification Search .................... 385/12, 385/27
See application file for complete search history.

(56) References Cited

U.S. PATENT DOCUMENTS

| | | | |
|---|---|---|---|
| 3,997,235 A | | 12/1976 | Boliver |
| 4,140,021 A | * | 2/1979 | Nomura et al. .................. 73/587 |
| 4,989,989 A | * | 2/1991 | Wolfe et al. ..................... 374/107 |
| 5,061,680 A | * | 10/1991 | Paulson et al. ................. 505/162 |
| 5,289,128 A | * | 2/1994 | DeMeester et al. ........... 324/318 |
| 5,683,179 A | * | 11/1997 | Lowry ............................. 374/17 |
| 6,417,751 B1 | * | 7/2002 | Yamaguchi .................... 335/216 |
| 6,448,501 B1 | * | 9/2002 | McIntyre et al. .......... 174/125.1 |
| 2002/0134574 A1 | * | 9/2002 | Hughey et al. ............. 174/125.1 |

FOREIGN PATENT DOCUMENTS

| | | |
|---|---|---|
| JP | 07-170721 | 7/1995 |
| JP | 11-162269 | 6/1999 |
| JP | 2005-516363 | 6/2005 |

* cited by examiner

*Primary Examiner* — K. Cyrus Kianni
(74) *Attorney, Agent, or Firm* — Sherr & Vaughn, PLLC

(57) ABSTRACT

Disclosed is a superconducting power cable capable of quench detection, and a quench detection system using the superconducting power cable. The superconducting power cable capable of quench detection includes a former; a superconducting conductor layer composed of a superconducting wire and surrounding the former; a conductor layer quench detection coil interposed between the former and the superconducting conductor layer and surrounding the former; an insulating layer surrounding the superconducting conductor layer; and a shielding layer surrounding the insulating layer. This superconducting power cable may detect quench generated during its operation in real time.

2 Claims, 3 Drawing Sheets (Prior Art) [Fig. 1]
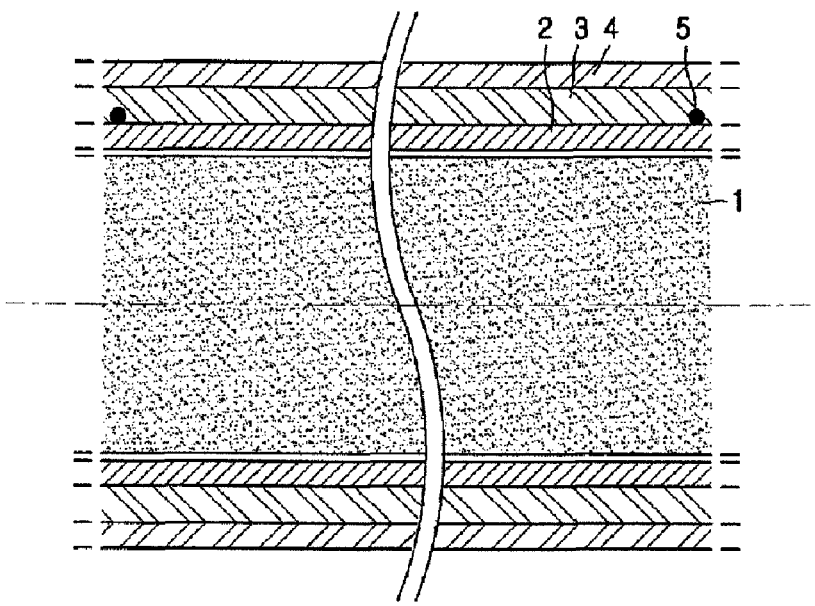
[Fig. 2]
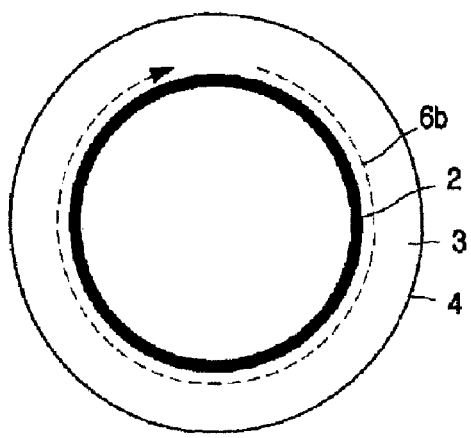
[Fig. 3]
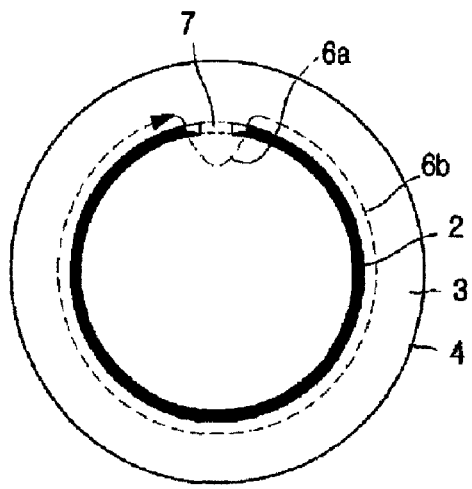

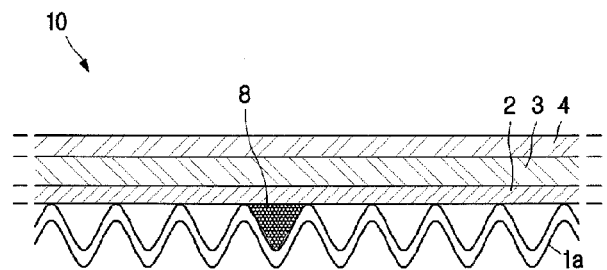
[Fig. 4]
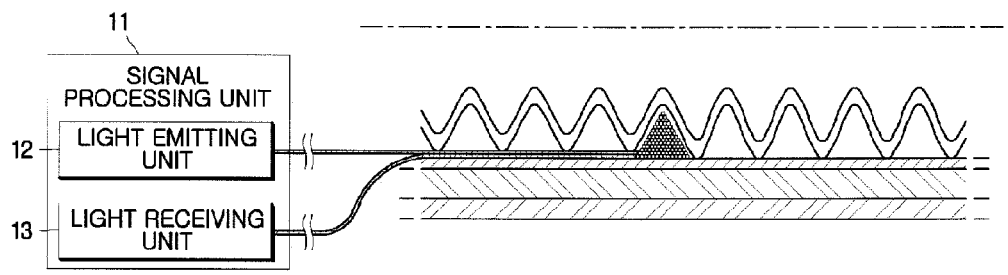
[Fig. 5]
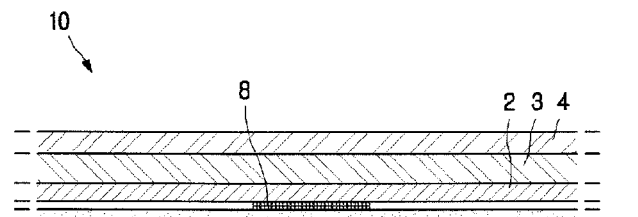
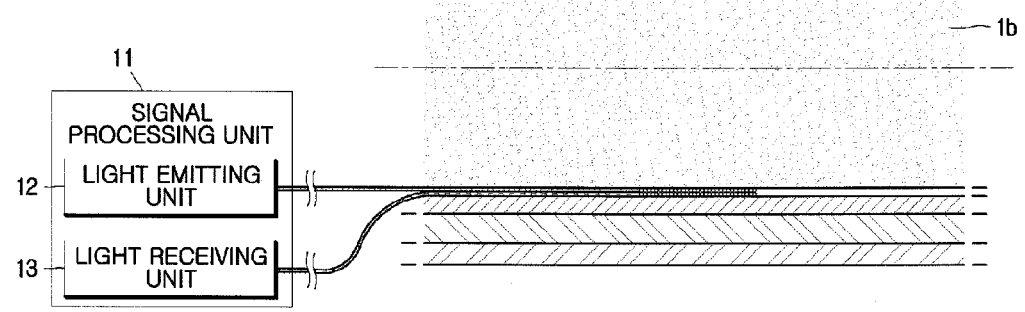
[Fig. 6]
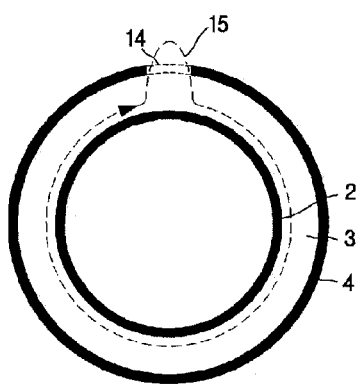

[Fig. 7]
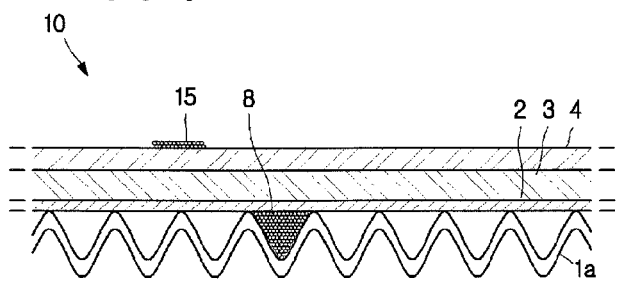
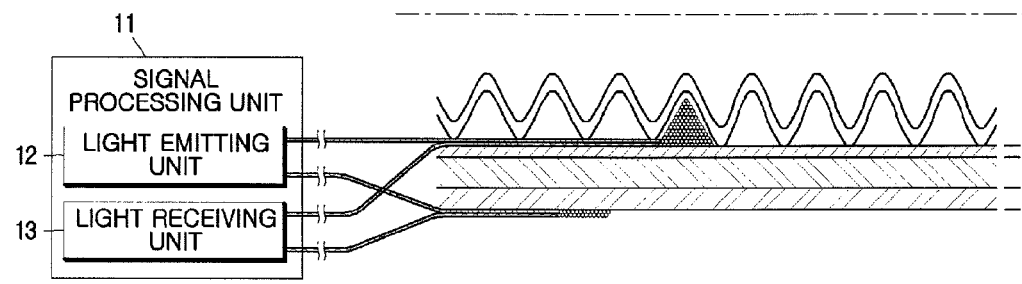
[Fig. 8]
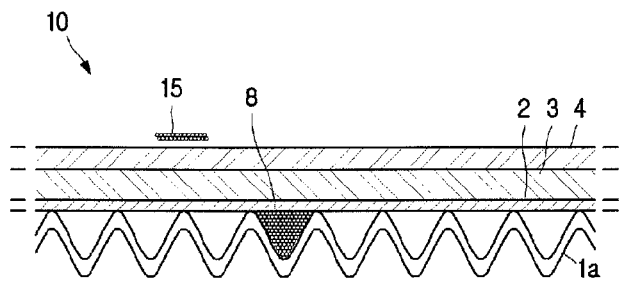
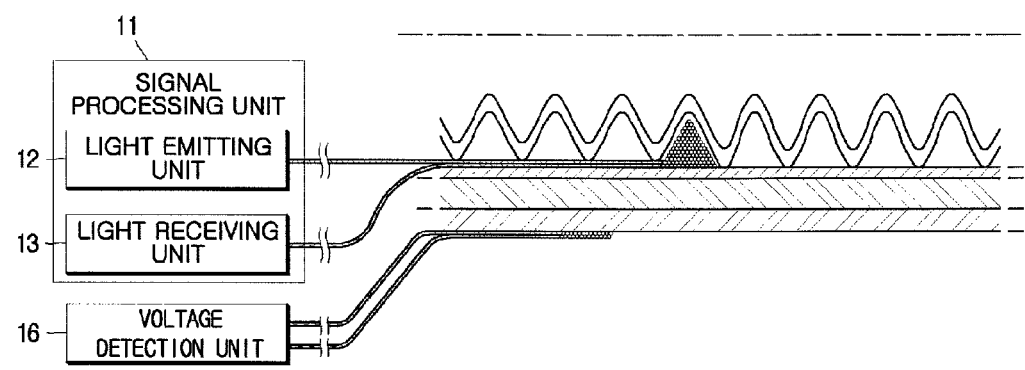

SUPERCONDUCTING POWER CABLE CAPABLE OF QUENCH DETECTION AND QUENCH DETECTION SYSTEM USING THE SAME

CROSS REFERENCE TO PRIOR APPLICATION

The present application is a Continuation Application of co-pending U.S. patent application Ser. No. 11/596,637 (filed on Nov. 14, 2006), which is a National Stage Application of PCT International Application No. PCT/KR2005/002085 (filed on Jun. 30, 2005) under 35 U.S.C. §371, which claims priority to Korean Patent Application No. 10-2005-0003423 (filed on Jan. 13, 2005), which is hereby incorporated by reference in its entirety.

TECHNICAL FIELD

The present invention relates to a superconducting power cable and a quench detection system using the cable, and more particularly to a superconducting power cable capable of detecting quench of a superconducting wire that may occur during operation of the superconducting power cable in real time and a quench detection system using the superconducting power cable.

BACKGROUND ART

A superconductor is a perfect conductor that shows no energy loss at a very low temperature since an electric resistance is completely disappeared, and it is applied to various fields. Recently, a power cable employing a superconducting wire is used for meeting the increasing power demands in a metropolis.

The power cable employing a superconducting wire shows better electricity transmission capability than a conventional one employing copper, so this power cable may transmit a large amount of power and reduce losses during electric transmission rather than a power cable employing copper. Thus, there is no need to increase a sectional area of a cable for transmission of a large amount of power, and therefore the above power cable may efficiently transmit a large amount of power though the cable is designed in a small size.

Meanwhile, a superconductor may keep its superconductivity only within the ranges of three critical values, namely a critical temperature, a critical magnetic field and a critical current density, so the superconductor loses the superconductivity and changes its phase into an ordinary conductive state beyond the critical values. Thus, it is required to check whether the superconductivity of a superconducting wire is kept during the operation of the superconducting power cable.

FIG. 1 is a longitudinal sectional view showing a conventional superconducting power cable having a quench detection structure of a superconducting conductor layer. Referring to FIG. 1, the superconducting power cable includes a former 1, a conductor layer 2 made of a superconducting wire and surrounding the former 1, an insulating layer 3 for insulating the conductor layer 2, and a shielding layer 4 surrounding the insulating layer 3 for electric shielding. A flattening layer (not shown) interposed between the former 1 and the conductor layer 2 and surrounding the former 1 may be further included so as to flatten the surface of the former 1.

The conductor layer 2 is configured with a superconducting wire having a tape shape arranged on a circumferential surface of the former 1, and it has a multi-layer structure for transmitting a large amount of power. The superconducting wire frequently loses its superconductivity since it comes out of the above critical ranges due to a defect of the superconducting wire itself, a defect capable of being generated during the cabling procedure, and a defect of a cooling system caused by impurities included in a coolant that keeps the superconducting wire below a critical temperature. This phenomenon that a superconductor loses its superconductivity and changes its phase into an ordinary conductive state is called quench.

If quench is generated in any superconducting wire of the superconducting power cable to change the phase of the superconducting wire into an ordinary conductive state, an amount of current capable of flowing in the superconducting wire is decreased. Thus, though a superconducting power cable is manufactured to have a constant electric current flowing in each layer of the superconducting conductor layer 2, if quench occurs, remaining electric currents flow in other superconducting wires where no quench occurs. As a result, the possibility that other superconducting wires having no quench exceed a critical current is increased. If quench occurs in another superconducting wire exceeding the critical current, the superconducting state of the cable itself is broken, so the transmission capability of the cable is greatly deteriorated.

Thus, it is important to detect the generation of quench during the operation of the superconducting power cable. For this purpose, voltage terminals 5 provided to both ends of the conductor layer 2 in a length direction may be used to detect quench by measuring voltages of both ends. However, since a high voltage is applied to the conductor layer 2 of the superconducting power cable, it is impossible to measure minute signals generated by quench. Even if this measurement is available, a measuring device is damaged due to the high voltage, so quench cannot be detected while an electric power is actually transmitted.

DISCLOSURE OF INVENTION

Technical Problem

The present invention is designed in consideration of the above problems, and therefore it is an object of the invention to provide a superconducting power cable capable of detecting quench occurring during the operation of the superconducting power cable, and a quench detection system using the superconducting power cable.

Technical Solution

In order to accomplish the above object, the present invention provides a superconducting power cable capable of quench detection, which includes a former; a superconducting conductor layer composed of a superconducting wire and surrounding the former; a conductor layer quench detection coil interposed between the former and the superconducting conductor layer and composed of an optical fiber surrounding the former; an insulating layer surrounding the superconducting conductor layer; and a shielding layer surrounding the insulating layer.

In the superconducting power cable capable according to the present invention, the shielding layer is preferably composed of a superconducting wire, and the superconducting power cable may further include a shielding layer quench detection coil surrounding the shielding layer.

In the superconducting power cable capable according to the present invention, the shielding layer quench detection coil is preferably composed of an optical fiber or a conductor.

In the superconducting power cable capable according to the present invention, a plurality of irregularities are preferably formed on a surface of the former so that the conductor layer quench detection coil surrounds a concave portion of one of the plurality of irregularities.

In another aspect of the present invention, there is also provided a quench detection system of a superconducting power cable, which includes a superconducting power cable; and a signal processing unit connected to the superconducting power cable, wherein the superconducting power cable includes a former; a superconducting conductor layer composed of a superconducting wire and surrounding the former; a conductor layer quench detection coil interposed between the former and the superconducting conductor layer and composed of an optical fiber surrounding the former; an insulating layer surrounding the superconducting conductor layer; and a shielding layer surrounding the insulating layer, wherein the signal processing unit is connected to the conductor layer quench detection coil to generate an input light of the conductor layer quench detection coil, and receives an output light polarized in the conductor layer quench detection coil to generate a conductor layer quench generation signal.

In the quench detection system of a superconducting power cable according to the present invention, preferably, the shielding layer is composed of a superconducting wire, and the superconducting power cable further includes a shielding layer quench detection coil composed of an optical fiber surrounding the shielding layer, wherein the signal processing unit is preferably connected to the shielding layer quench detection coil to generate an input light of the shielding layer quench detection coil, and receives an output light polarized in the shielding layer quench detection coil to further output a shielding layer quench generation signal.

In the quench detection system of a superconducting power cable according to the present invention, the shielding layer is preferably composed of a superconducting wire, and the superconducting power cable further includes a shielding layer quench detection coil composed of a conductor surrounding the shielding layer, wherein the quench detection system preferably further includes a voltage detecting unit connected to the shielding layer quench detection coil to detect a voltage of the shielding layer quench detection coil when quench occurs in the shielding layer.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a longitudinal sectional view showing a conventional superconducting power cable having a quench detection structure of a superconducting conductor layer;

FIG. 2 is a sectional view showing a superconducting power cable, which illustrates magnetic field distribution in the superconducting power cable in a normal state;

FIG. 3 is a sectional view showing a superconducting power cable, which illustrates magnetic field distribution in the superconducting power cable when quench occurs in a superconducting conductor layer;

FIG. 4 shows configuration of a quench detection system for a superconducting power cable provided with a wrinkled former according to one embodiment of the present invention;

FIG. 5 shows configuration of a quench detection system for a superconducting power cable provided with a conductor strand former according to another embodiment of the present invention;

FIG. 6 is a sectional view showing a superconducting power cable, which illustrates magnetic field distribution in the superconducting power cable when quench occurs in a superconducting shielding layer;

FIG. 7 shows configuration of a quench detection system for a conductor layer or a shielding layer of a superconducting power cable according to still another embodiment of the present invention; and FIG. 8 shows configuration of a quench detection system for a conductor layer or a shielding layer of a superconducting power cable according to further another embodiment of the present invention.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 2 is a sectional view showing a superconducting power cable, which illustrates magnetic field distribution of the superconducting power cable in a normal state, and FIG. 3 is a sectional view showing a superconducting power cable, which illustrates magnetic field distribution of the superconducting power cable when quench occurs in a superconducting conductor layer. Referring to FIG. 2, in case a current flows uniformly in each superconducting wire that configure a conductor layer 2, an outer magnetic field 6b of a certain size is formed out of the conductor layer 2, but no magnetic field is formed within the conductor layer 2. However, if a part of the superconducting wires 7 lose their superconductivity and cause generation of quench during the operation of the cable, a current flowing in the quenched superconducting wire 7 is decreased, and the remaining current is distributed again to surrounding superconducting wires and flows therein, so a magnetic field 6a is formed within the conductor layer as shown in FIG. 3. Thus, quench of the conductor layer 2 can be detected by sensing the change of the magnetic field 6a flowing in the conductor layer 2.

FIG. 4 shows configuration of a quench detection system for a superconducting power cable provided with a wrinkled former according to one embodiment of the present invention. Referring to FIG. 4, the system includes a superconducting power cable 10 provided with a conductor layer quench detection coil 8 for detecting a change of the magnetic field 6a in the conductor layer 2, and a signal processing unit 11 for detecting a quench signal when quench occurs.

The superconducting power cable 10 includes a wrinkled former 1a, a conductor layer 2 composed of a superconducting wire and surrounding the winkled former 1a, an insulating layer 3 surrounding the conductor layer 2, and a shielding layer 4 surrounding the insulating layer 3. The superconducting power cable 10 further includes a conductor layer quench detection coil 8 installed to surround the wrinkled former 1a in a ring shape.

The wrinkled former 1a according to this embodiment has a plurality of irregularities formed on its surface. This wrinkled former 1a has an inner hollow, and this inner hollow acts as a passage of liquid nitrogen, which cools the superconducting wire below a critical temperature to keep its superconductivity.

The conductor layer quench detection coil 8 is a coil interposed between the wrinkled former 1a and the conductor layer 2 and surrounding the wrinkled former 1a in a ring shape so as to detect quench of the superconducting conductor layer 2. In case quench occurs in the conductor layer 2, the conductor layer quench detection coil 8 detects the change of magnetic field and then sends a corresponding signal to the signal processing unit 11 connected to both ends of the conductor layer quench detection coil 8. In addition, the conductor layer quench detection coil 8 is composed of an optical fiber and thus does not cause any electric interference with the conductor layer 2, thereby giving no influence on power transmission of the superconducting power cable 10.

The signal processing unit 11 is installed out of the superconducting power cable 10 and detects a quench signal occurring at the conductor layer quench detection coil 8 in case quench occurs in the conductor layer 2. The signal processing unit 11 includes a light emitting unit 12 that is a light generation element such as a laser diode, and a light receiving unit 13 that is a light detection element such as a photodiode. Thus, the signal processing unit 11 inputs the light, generated in the light emitting unit 12 connected to one end of the conductor layer quench detection coil 8, into the conductor layer quench detection coil 8, and receives the light emitted from the conductor layer quench detection coil 8 through the light receiving unit 13 connected to the other end of the conductor layer quench detection coil 8.

Now, a quench detection procedure of the superconducting power cable 10 configured as mentioned above is described as follows.

The light generated in the light emitting unit 12 and input to the conductor layer quench detection coil 8 is detected as an electric signal by means of the light receiving unit 13 acting as a light detection element. If quench occurs in the conductor layer 2, the light passing through the conductor layer quench detection coil 8 is polarized due to the change of magnetic field, and then output to the light receiving unit 13.

That is to say, according to the Faraday's Magneto Optical Law, if a plane-polarized light is input to a transparent material in a magnetic field, the light transmitting through the transparent material has a rotated polarization surface. Thus, since a size of the magnetic field in the conductor layer 2 becomes zero if no quench occurs, a polarization plane of the light transmitting through the conductor layer quench detection layer 8 laterally wound around the former is not rotated. However, if quench occurs, a size of the magnetic field 6a within the conductor layer 2 has a value greater than zero, so the polarization plane of the light is rotated.

A rotating angle of the polarization surface can be expressed as the following equation.

$$\theta = kN \oint H \cdot dl = kNI \quad \text{Equation 1}$$

where θ: a rotating angle of the polarization plane, k: a proportional factor, N: a laterally winding number of an optical fiber around the former, and I: a magnitude of the magnetic field.

Thus, as the size of the magnetic field is greater, and also as a laterally winding number of the conductor layer quench detection coil 8 around the former is greater, a rotating angle of the polarization surface is increased. The light polarized as mentioned above is output to the light receiving unit 13. Depending on an intensity of the light passing through the polarization surface (not shown), a voltage is generated in the light receiving unit 13 as follows, and thus it is enabled to detect the generation of quench.

$$V_{OUT} \propto V_{IN} \text{SIN}(2\theta) \quad \text{Equation 2}$$

where $V_{OUT}$: an output voltage of the light receiving unit, $V_{IN}$: an input voltage of the light emitting unit, θ: a rotating angle of the polarization surface.

In order to sensitively detect the generation of quench, it is preferred to increase the laterally winding number of the conductor layer quench detection coil 8 around the former as explained in the above equation.

Meanwhile, as shown in FIG. 4, the conductor layer quench detection coil 8 is preferably installed to surround a concave portion of any one of the plurality of irregularities formed in the surface of the wrinkled former 1a so that no influence is given to the outer circumference of the superconducting power cable 10.

FIG. 5 shows configuration of a quench detection system for a superconducting power cable provided with a conductor strand former according to another embodiment of the present invention. Referring to FIG. 5, the superconducting power cable 10 of this embodiment employs a conductor strand former 1b such as copper, so the surface of the superconducting power cable 10 is flat differently from the wrinkled former 1a of FIG. 4. Thus, as shown in FIG. 5, the conductor layer quench detection coil 8 preferably surrounds the conductor strand former 1b in a thin thickness so as not to give any influence on the outer circumference of the superconducting power cable 10.

Meanwhile, the shielding layer 4 of the superconducting power cable 10 may be composed of a common conductor or a superconducting wire. Thus, quench may occur in the superconducting shielding layer as well as in the conductor layer.

FIG. 6 is a sectional view showing a superconducting power cable, which illustrates magnetic field distribution in the superconducting power cable when quench occurs in the superconducting shielding layer. The superconducting shielding layer 4 where no quench occurs completely intercepts a magnetic flux generated in the conductor layer 2, so a magnetic field of a certain size is formed in the superconducting shielding layer 4, but no magnetic field is formed out of the superconducting shielding layer 4. However, if a part of the superconducting wires 14 lose their superconductivity and cause generation of quench while the superconducting power cable 10 is operating, a magnetic flux is leaked into a part of the superconducting wires 14 of the superconducting shielding layer 4 where quench occurs as shown in FIG. 6, so a magnetic field 15 is formed out of the superconducting shielding layer 4. Thus, quench of the superconducting shielding layer 4 may be detected by sensing the change of the outer magnetic field 15 of the superconducting shielding layer 4.

FIG. 7 shows configuration of a quench detection system for a conductor layer or a shielding layer of a superconducting power cable according to still another embodiment of the present invention. Referring to FIG. 7, the system includes a superconducting power cable 10, and a signal processing unit 11 connected to the superconducting power cable 10 to detect quench in the conductor layer 2 and the superconducting shielding layer 4.

The superconducting power cable 10 includes a wrinkled former 1a, a superconducting conductor layer 2, an insulating layer 3, a shielding layer 4 and a conductor layer quench detection coil 8, and also further includes a shielding layer quench detection coil 15 composed of copper and surrounding the superconducting shielding layer 4. The embodiment of FIG. 7 is illustrated based on the superconducting power cable 10 provided with the wrinkled former 1a, but a superconducting power cable 10 provided with a conductor strand former 1b may also be used. Both ends of the conductor layer quench detection coil 8 and the shielding layer quench detection coil 15 are respectively connected to the light emitting unit 12 and the light receiving unit 13, so the signal processing unit 11 may detect quench in the shielding layer 4 as well as in the conductor layer 2. The quench detection procedure is identical to that explained with reference to FIG. 4.

Meanwhile, the shielding layer quench detection coil 15 may be composed of an optical fiber similarly to the conductor layer quench detection coil 8, or composed of a conductor such as copper. Since the superconducting shielding layer 4 is grounded differently from the superconducting conductor layer 2 to which a high voltage is applied, there is no electric problem though the superconducting shielding layer 4 is connected to the shielding layer quench detection coil 15.

FIG. 8 shows configuration of a quench detection system for a conductor layer or a shielding layer of a superconducting power cable according to further another embodiment of the present invention. Referring to FIG. 8, the system includes a superconducting power cable 10, a signal processing unit 11 connected to the superconducting power cable 10 to detect quench in the conductor layer 2, and a voltage detection unit 16 connected to the superconducting power cable 10 to detect quench of the shielding layer 4.

The superconducting power cable 10 includes a wrinkled former 1a, a superconducting conductor layer 2, an insulating layer 3, a shielding layer 4 and a conductor layer quench detection coil 8, and also further includes a shielding layer quench detection coil 15 composed of a conductor surrounding the superconducting shielding layer 4. The embodiment of FIG. 8 is illustrated based on the superconducting power cable 10 provided with the wrinkled former 1a, but a superconducting power cable 10 having a conductor strand former 1b may also be used.

If no quench occurs in the shielding layer 4, namely if a magnetic flux is not leaked out of the shielding layer 4, voltage is not induced to the shielding layer quench detection coil 15. However, in case quench occurs in the shielding layer 4, namely if a magnetic flux is leaked out of the shielding layer 4, a predetermined voltage is induced to the shielding layer quench detection coil 15. Thus, the voltage detection unit 16 connected to both ends of the shielding layer quench detection coil 15 detects a voltage signal, thereby allowing detection of quench in the shielding layer 4. The voltage detection unit 16 may employ a voltmeter or an oscilloscope.

According to this embodiment, the signal processing unit 11 for processing an optical signal detects quench when the quench occurs in the conductor layer 2, and the voltage detection unit 16 for detecting a voltage signal detects quench when the quench occurs in the shielding layer 4.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

Industrial Applicability

According to the present invention, it is possible to detect quench occurring during the operation of a superconducting power cable in real time without giving any influence on power transmission of the superconducting power cable.

The invention claimed is:

1. A superconducting power cable capable of quench detection, comprising:
   a former;
   a superconducting conductor layer composed of a superconducting wire and surrounding the former;
   an insulating layer surrounding the superconducting conductor layer;
   a shielding layer composed of a superconducting wire and surrounding the insulating layer; and
   a shielding layer quench detection coil surrounding the shielding layer.

2. The superconducting power cable capable of quench detection according to claim 1, wherein the shielding layer quench detection coil is composed of an optical fiber or a conductor.

* * * * *